US010203833B2

United States Patent
Kahana Samet et al.

(10) Patent No.: US 10,203,833 B2
(45) Date of Patent: Feb. 12, 2019

(54) RECOMMENDING APPLICATION MODIFICATIONS USING IMAGE AREA COUNTS

(71) Applicant: HEWLETT PACKARD ENTERPRISE DEVELOPMENT LP, Houston, TX (US)

(72) Inventors: Rachel Kahana Samet, Yehud (IL); Dror Saaroni, Yehud (IL)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 246 days.

(21) Appl. No.: 15/038,060

(22) PCT Filed: Nov. 26, 2013

(86) PCT No.: PCT/US2013/071843
§ 371 (c)(1),
(2) Date: May 20, 2016

(87) PCT Pub. No.: WO2015/080691
PCT Pub. Date: Jun. 4, 2015

(65) Prior Publication Data
US 2016/0306471 A1     Oct. 20, 2016

(51) Int. Cl.
| | | |
|---|---|---|
| G06F 11/36 | (2006.01) |
| G06F 11/00 | (2006.01) |
| G06F 3/048 | (2013.01) |
| G06F 11/30 | (2006.01) |
| G06F 17/18 | (2006.01) |
| G06F 11/34 | (2006.01) |

(52) U.S. Cl.
CPC ............. *G06F 3/048* (2013.01); *G06F 11/00* (2013.01); *G06F 11/3051* (2013.01); *G06F 11/34* (2013.01); *G06F 11/36* (2013.01); *G06F 17/18* (2013.01)

(58) Field of Classification Search
CPC .................................. G06T 5/50; G08G 1/054
USPC ................................................... 715/761–765
See application file for complete search history.

(56) References Cited

U.S. PATENT DOCUMENTS 6,434,513 B1    8/2002  Sherman et al.
7,620,241 B2 *  11/2009  Fan ........................... G06T 5/50
                                                                     348/246

(Continued)

OTHER PUBLICATIONS

Korean Intellectual Property Office, International Search Report and Written Opinion, dated Aug. 28, 2014, 9 pages, Daejeon Metropolitan City, Republic of Korea.

(Continued)

*Primary Examiner* — Cao H Nguyen (57) ABSTRACT

In one example of the disclosure, a set of image frames of a software application display, taken in sequence over a recording period, is obtained. For each frame from the set, a count of image areas that changed as between the frame and an adjacent frame is determined, and the count is recorded in correlation with order of recording of the frame relative to other frames of the set. An application-active period during which consecutive frames have changed-areas counts exceeding a changed-areas threshold is identified. Upon determining that duration of the application-active period exceeds a threshold period, a recommendation to modify the application is generated.

18 Claims, 7 Drawing Sheets

(56) References Cited

U.S. PATENT DOCUMENTS

| | | | |
|---|---|---|---|
| 8,953,044 B2* | 2/2015 | Wu | G08G 1/054 |
| | | | 348/143 |
| 2005/0188357 A1 | 8/2005 | Derks et al. | |
| 2006/0265190 A1 | 11/2006 | Hein | |
| 2009/0037774 A1 | 2/2009 | Rideout et al. | |
| 2011/0276836 A1 | 11/2011 | Kahana et al. | |
| 2012/0253733 A1 | 10/2012 | Gawande et al. | |
| 2013/0024845 A1 | 1/2013 | Lanzkron et al. | |
| 2013/0080634 A1 | 3/2013 | Grelewicz et al. | |
| 2013/0111007 A1 | 5/2013 | Hoffmann et al. | |
| 2013/0115928 A1 | 5/2013 | Kies et al. | |
| 2014/0010407 A1* | 1/2014 | Sinha | G06K 9/00664 |
| | | | 382/103 |
| 2015/0104106 A1* | 4/2015 | Elinas | G06K 9/4638 |
| | | | 382/201 |
| 2016/0277705 A1* | 9/2016 | Dimson | G11B 27/031 |

OTHER PUBLICATIONS

Unknown, Performance, Aug. 2, 2013, 12 pages https://developer.mozilla.org/en-US/docs/Mozilla/Firefox_OS/Performance.

Unknown, Windows Phone Application Analysis, May 3, 2013, 5 pages http://msdn.microsoft.com/en-us/library/windowsphone/develop/hh202934(v=vs.105).aspx.

* cited by examiner

RECOMMENDING APPLICATION MODIFICATIONS USING IMAGE AREA COUNTS

CROSS-REFERENCE TO RELATED APPLICATION

This application is a U.S. National Stage Application of and claims priority to International Patent Application No. PCT/US2013/071843, filed on Nov. 26, 2013, and entitled "RECOMMENDING APPLICATION MODIFICATIONS USING IMAGE AREA COUNTS," the entire content of which is hereby incorporated in its entirety.

BACKGROUND

Vast numbers of mobile web application, native mobile web applications, PC browser-based web applications, and other web applications are developed each year. These applications frequently provide a graphical user interface display through which a user can receive information about the application or offerings of the application, and interact with the application to exercise various functions.

DETAILED DESCRIPTION

Introduction: One of the main characteristics of a successful web application is the speed with which a user can utilize the application to procure information or perform a task. Users will react positively to a web application that operates in a manner that users perceive as requiring minimal effort and time. On the other hand, a web application that provides a poor responsiveness will not be adopted by users. For example, a web application with a GUI that shows a progress bar for long actions, or that takes too much time to load, may be rejected by users in favor of another application is perceived be faster. Thus, an ability to measure to identify slowness in a software application from the user perspective is crucial.

Typically, however, measuring web application performance from the user perspective has required specific instrumentation and/or required developers to create additional coding that can be costly and time consuming to implement. To address these issues, various embodiments described in more detail below provide for a system and a method to enable testing of a software application operating speed from the user's perspective, and generation of recommendations to modify the application, with minimal equipment and without the need for writing additional code to the application for testing purposes. In an example of the disclosure, a set of image frames of a software application display, taken in sequence over a recording period, is obtained. For each frame from the set when considered individually, a frame from a set is sometimes referred to herein as a "target frame"), a count of pixels or other image areas that changed as between that target frame and an adjacent frame is determined. In an example, the adjacent frame is a frame recorded immediately preceding the target frame. In another example, the adjacent frame is a frame recorded immediately after the target frame. The changed-areas count is recorded in correlation with order of recording of the frame relative to other frames of the set. Periods which are subsets of the recording period, and during which consecutive frames have changed-areas counts exceeding a changed-areas threshold, are identified as application-active periods. The application-active periods are compared to a threshold period. Upon determining that duration of an application-active period exceeds the threshold period, a recommendation to modify the application is generated. In an example, the generated recommendation is a recommendation to modify the application in a manner designed to shorten the application-active period that was identified as exceeding the threshold period.

In an example, recording the changed-areas count in correlation with chronological order of recording of the frame may include creating a graph. In an example, the graph may be graph that plots a set of consecutive image frames against a number of image areas that change as between a frame and an adjacent frame. In an example, determining that duration of an application-active period exceeds a threshold period may include determining a width or height, or distance between, of elements of the graph that define or measure the application-active period.

In this manner, embodiments of this disclosure present an automated and efficient manner to recommend modifications to a web application or other software application using counts of image area changes in the application's graphic user interface taken over a recording period. Designers and users of software applications, and of the computing devices that execute or access such applications, will appreciate the ability to achieve visibility as to the time taken for an application to move from state to state as the end user experiences it, without a need for expensive instrumentation or writing measuring code lines or other code into the software application to enable testing. And as such testing is thus nonintrusive, the disclosed system and method may be used in testing of the application at a variety of times and manners, e.g., beta testing, emulator testing, automatic testing, crowd testing and even in monitoring real user behaviors. Such advantages of the disclosure will cause customer satisfaction with software applications that have been optimized as a result of modification recommendations, and with the computing devices that execute or access the optimized software applications, to increase.

It should be noted that while the present disclosure is discussed frequently herein with reference to mobile web applications, native web applications, and other web applications, the teachings of the present disclosure are not so limited and can be applied to test any software application.

The following description is broken into sections. The first, labeled "Environment," describes an environment in which various embodiments may be implemented. The second section, labeled "Components," describes examples of various physical and logical components for implementing various embodiments. The third section, labeled "Illustrative Example," presents an example of recommending application modifications using image area counts. The fourth section, labeled as "Operation," describes steps taken to implement various embodiments.

Figure 1:
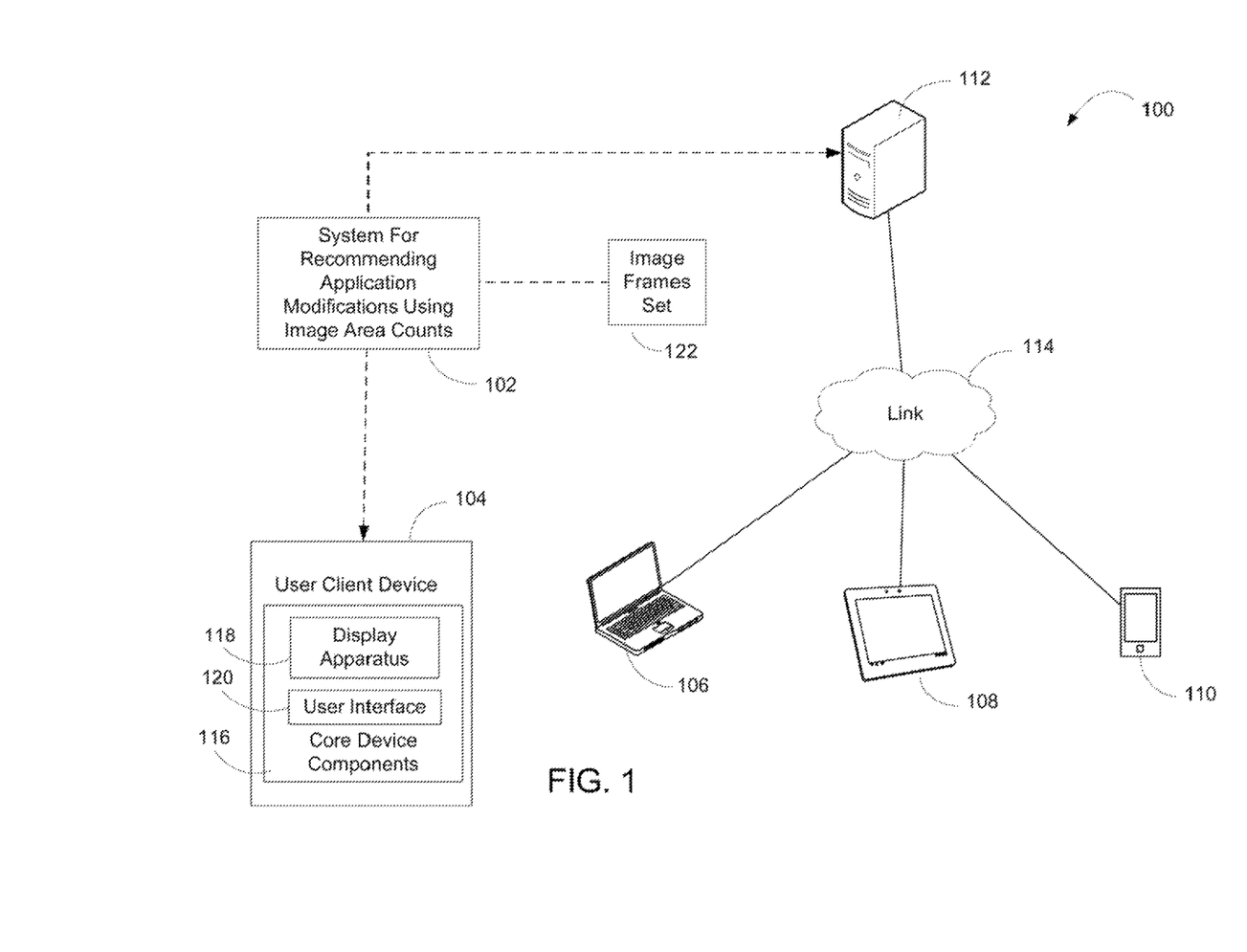
FIG. 1 is a block diagram depicting an example environment in which various embodiments may be implemented.

Environment: FIG. 1 depicts an example environment 100 in which embodiments may be implemented as system for recommending application modifications using image area counts 102. Environment 100 is show to include client devices 104, 106, 108, and 110, and a server device 112. Components 104-112 are interconnected via link 114.

Link 114 represents generally any infrastructure or combination of infrastructures configured to enable an electronic connection, wireless connection, or other connection to enable data communication between components 104-112. Such infrastructure or infrastructures may include, but are not limited to, one or more of a cable, wireless, fiber optic, or remote connections via telecommunication link, an infrared link, or a radio frequency link. For example, link 114 may represent the internet, one or more intranets, and any intermediate routers, switches, and other interfaces. As used herein an "electronic connection" refers generally to a transfer of data between components, e.g., between two computing devices, that are connected by an electrical conductor. A "wireless connection" refers generally to a transfer of data between two components, e.g., between two computing devices, that are not directly connected by an electrical conductor. A wireless connection may be via a wireless communication protocol or wireless standard for exchanging data.

Client devices 104-110 represent generally any computing device with which a user may interact to communicate with other client devices and server device 112 via link 114. Server device 112 represents generally any computing device configured to serve an application and corresponding data consumption by client devices 104-110.

Client device 104 is shown to include core device components 116. Core device components 116 represent generally the hardware and programming for providing the computing functions for which device 104 is designed. Such hardware can include a processor and memory, a display apparatus 118, and a user interface 120. The programming can include an operating system and applications. Display apparatus 118 represents generally any combination of hardware and programming configured to exhibit or present a message, image, view, or other presentation for perception by a user, and can include, but is not limited to, a visual, tactile or auditory display. In examples, the display device may be or include a monitor, a touchscreen, a projection device, a touch/sensory display device, or a speaker. User interface 120 represents generally any combination of hardware and programming configured to enable interaction between a user and user client device 104 such that the user may effect operation or control of user client device 104. In examples user interface 120 may be, or include, a keyboard, mouse, keypad, or a mouse. In some examples, the functionality of display apparatus 118 and user interface 120 may be combined, as in the case of a touchscreen apparatus that may enable presentation of images at user client device 104, and that also may enable a user to operate or control functionality of user client device 104.

System 102, discussed in more detail below, represents generally a combination of hardware and programming configured to enable generation of application modification recommendations using image area counts. Briefly, a system for recommending application modifications using area counts 102 is configured to obtain a set of image frames, taken in sequence over a recording period, of a graphic user interface or other software application display. System 102 is to, for each frame from the set, determine a count of image areas that changed as between the frame and an adjacent frame. System 102 is to record the changed-areas count in correlation with the order of recording of the frame relative to other frames of the set. System 102 is to identify an application-active period during which consecutive frames have changed-areas counts that exceed a changed-areas threshold value. System 102 is to, upon determining that duration of the application-active period exceeds a threshold period, generate a recommendation for a modification to the software application.

System 102 may be wholly integrated within core device components 116. System 102 may be implemented as a component of server device 112 where it takes action based in part on data received from core device components 116 via link 114. System 102 may be distributed across client device 104 and server device 112. For example, obtaining a set of image frames 122 of a software application display, determining for each frame from the set 122 a count of image areas that changed and recording the changed-areas count may be performed on client device 104, while identifying an application-active period and generating a recommendation to modify the application may be performed by server device 112. Other distributions of system 102 across client device 104 and server device 112 are possible and contemplated by this disclosure. It is noted that all or portions of the system for recommending application modifications using image area counts 102 may also be included on client devices 106, 108 or 110.

It should be noted that there is no requirement that system 102 and the software application that from which the set 122 of display image frames of a display is captured necessarily reside on a same computing device. In an example, the software application for which a set 122 of display image frames is taken may be a standalone client application (e.g., a word processor application) that executes at client device 106, and client device 106 may transmit data representative of the set 122 of display image frames to the system 102 executing at client device 104. In another example, the application for which a set 122 of display image frames is taken may be a standalone client application that executes at client device 110, and client device 110 may transmit data representative of the set 122 of display image frames to the system 102 executing at server device 112. In yet another example, the application for which a set 122 of display image frames is taken may be a web application (e.g., a webmail application or any other client/server based application) that is accessed by a user at client device 104, with the application and the system 102 both being provided or served from server device 112. In another example, the application for which a set 122 of display image frames is taken may be a web application or any other client/server based application that is accessed by a user at client device 104, with system 102 being served or hosted from server device 112, and the application being provided or served from another server device that is separate and distinct from server device 112.

Figure 2:
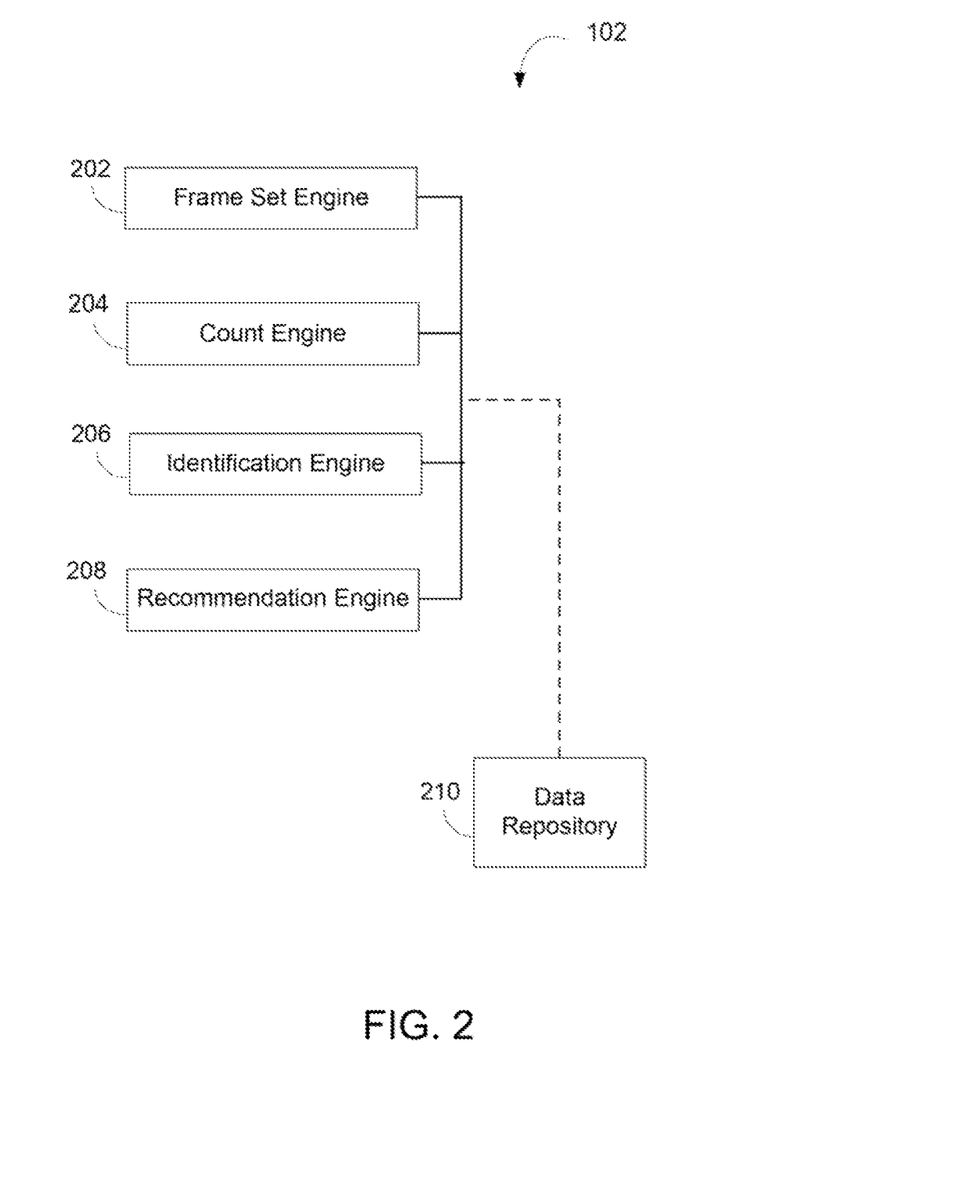
FIG. 2 is a block diagram depicting an example of a system to recommend application modifications using image area counts.
Figure 3:
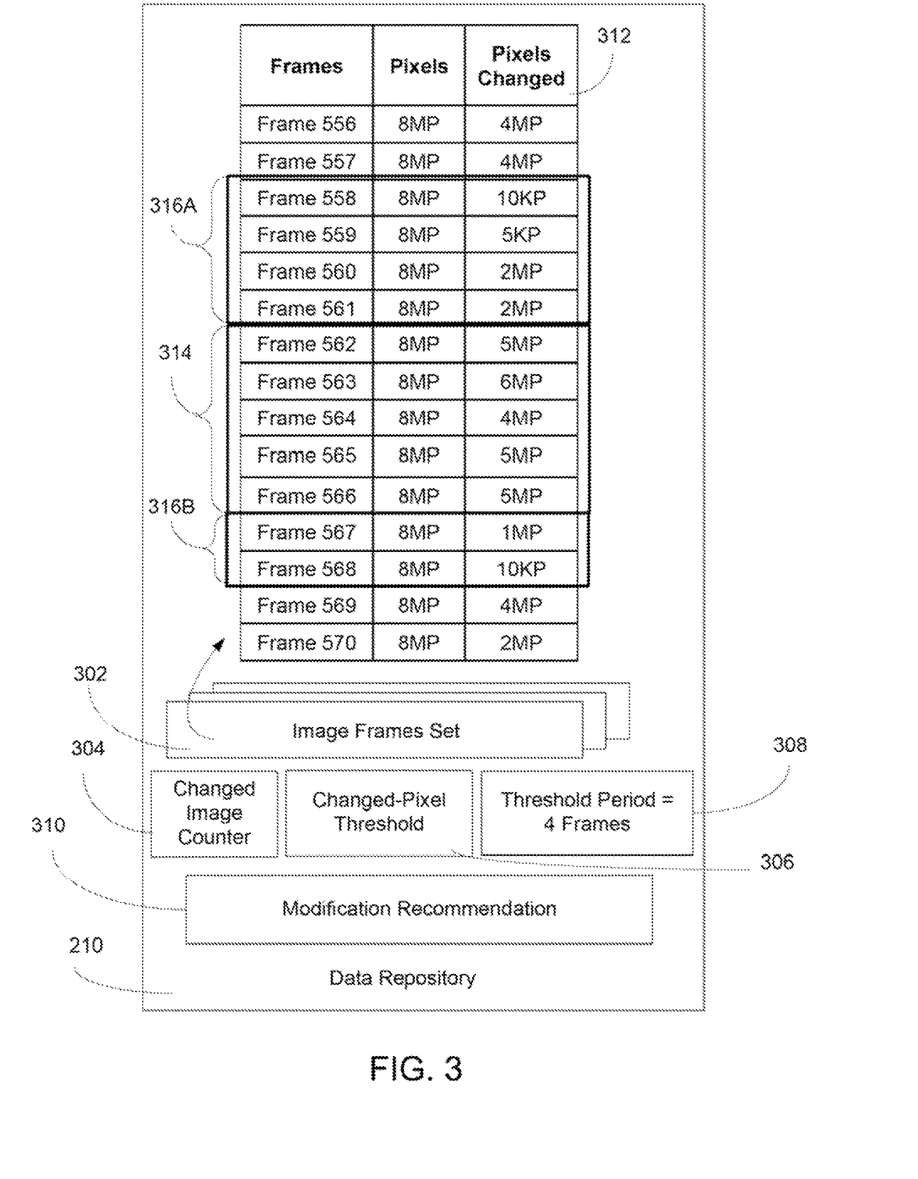
FIG. 3 is a block diagram depicting an example data structure for application modification recommendations.
Figure 4:
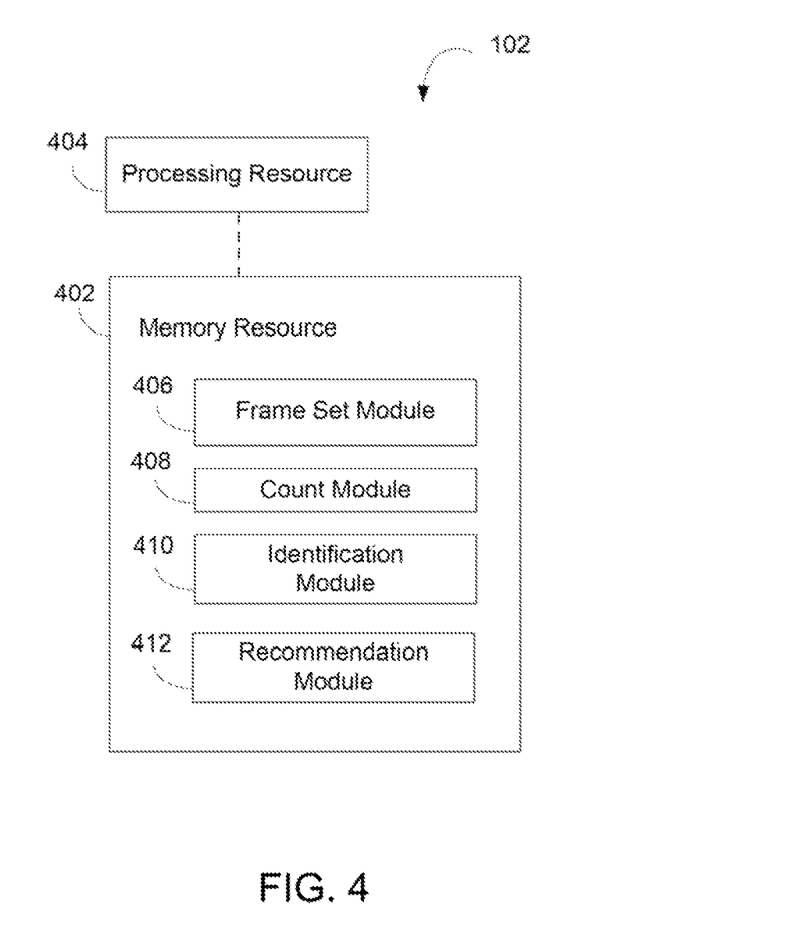
FIG. 4 is a block diagram depicting a memory resource and a processing resource according to an example.

Components: FIGS. 2-4 depict examples of physical and logical components for implementing various embodiments. In FIG. 2 various components are identified as engines 202, 204, 206, 208. In describing engines 202, 204, 206, 208 focus is on each engine's designated function. However, the term engine, as used herein, refers generally to a combination of hardware and programming configured to perform a designated function. As is illustrated later with respect to FIG. 4, the hardware of each engine, for example, may include one or both of a processor and a memory, while the programing may be code stored on that memory and executable by the processor to perform the designated function.

FIG. 2 is a block diagram depicting components of system for recommending application modifications using image area counts 102. In this example, system 102 includes frame set engine 202, count engine 204, identification engine 206, and recommendation engine 208. In performing their respective functions, engines 202, 204, 206, 208 may access data repository 210. Repository 210 represents generally any memory accessible to system 102 that can be used to store and retrieve data.

Frame set engine 202 represents a combination of hardware and programming configured to obtain a set of image frames, taken in sequence over a first period, of a software application display. As used herein, an "image" refers generally to a rendering of an object, scene, person, or abstraction such text or a geometric shape. As used herein, an "image frame" or "frame" refers generally to a single image within a sequence of captured images. As used herein, an "software application" or "application" refers generally to any programming that executes at, or accessible at, a computing device. In examples, a software application may manipulate text, numbers, graphics, or a combination of these elements to perform an activity. In examples the software application may be a mobile web application, a native web application, or other form of web application. As used herein, a "web application" refers generally to a computer software application or web page that is coded in a browser-supported language (such as XML, HTML, or HTML with JavaScript) and is reliant on a web browser application to render the application executable (or in the case of a web page, presentable). Examples of web applications are web pages, webmail, online search engines, online sale and auction sites, and wikis. As used herein, a "display" refers generally to an exhibition or presentation for perception by a user. In an example, the display is or includes a graphic user interface display.

In an example, frame set engine 202 may obtain the set of image frames by actively recording the image frames. In an example, the frame set engine 202 may be or include an video recording device that can record a "movie" of an application's display, recording the progression of the display one frame at a time. In examples, obtaining the set of image frames may include recording a graphic user interface as displayed upon a monitor utilizing a screen-capture movie maker that records the screen activity as an MPEG-1, MPEG-2, MP4, Audio Video Interleave ("AVI"), Windows Media Video ("WMV") or other video file format. In other examples, the frame set engine 202 may obtain the set of image frames by retrieving or receiving a previously recorded "movie" of a software application's display, the movie recording the progression of the display one frame at a time. In an example, obtaining the set of image frames may include receiving data representative of the set from another computing device. In another example, obtaining the set of image frames may include retrieving a previously recorded MPEG-1, MPEG-2, MP4, AVI, WMV, or other video file from a storage device.

Count engine 204 represents a combination of hardware and programming configured to, for each frame from the set, determine a count of image areas that changed as between that frame and an adjacent frame. For purposes of this disclosure, a frame from the set that is being considered individually to determine a count of image areas changed may be referred to as a "target frame." As used in this disclosure, an "adjacent frame" refers generally to a frame that is positioned within a pre-established or predefined number of frames from a target frame. In an example, an adjacent frame may be a frame that is pre-established or predefined as a frame that immediately precedes a target frame. In another example, an adjacent frame may be a frame that is pre-established or predefined as a frame that immediately follows a target frame.

After the determination of the changed-image-areas count for a target frame, the count engine 204 is to record the changed-image-areas count in correlation with the order of recording of the target frame relative to other frames of the set. In an example where the set of images frames is a set of frames 1-1000, and where a target frame from the set under evaluation is frame 577 and has an changed-image-areas count of 350,000, the count engine 204 may cause the changed-image-areas count of 350,000 to be recorded in correlation with the target frame number (577). A changed-image-areas count can be similarly recorded, in correlation with the order of recording of the target frame relative to other frames of the set, for each of the frames of the set as such frames are considered as target frames.

The identification engine 206 represents a combination of hardware and programming configured to analyze the changed-image-areas counts and associated frame numbers, and to identify at least one application-active period during which consecutive image frames have changed-areas counts that exceed a predetermined changed-areas threshold. In an example, an application-active period may be identified according to a rule application-active period=a set of consecutive frames
having a changed-areas count>than the
changed-areas threshold $X$, wherein, "X" is a variable representing a number greater than zero. In an example, if the predetermined changed-areas threshold is a change of 50,000 image areas as between a target frame from the set and an adjacent frame, and the identification engine 206 identifies a series of consecutive frames in which the changed-areas count exceeds the 50,000 changed-image-areas threshold, that series of consecutive frames is identified as an "application active period."

The recommendation engine 208 represents a combination of hardware and programming configured to generate a recommendation to modify the application based at least in part upon a determination that duration of an identified application-active period exceeds a threshold period. In a particular example, the recommendation may be generated according to a rule if the duration of an application-active period is a
period>a Y frames threshold period,
generate a recommendation to modify the application's
performance during that application-active period,
wherein, "Y" is a variable representing a number greater than zero.

FIG. 3 depicts an example implementation of data repository 210. In this example, repository 210 includes data indicative of a set of obtained image frames 302, a changed image counter 304, a changed-pixel threshold 306, a threshold period 308, and a modification recommendation 310. Referring back to FIG. 2 in view of FIG. 3, in an example, the frame set engine 202 (FIG. 2) obtains the set of image frames 302. The image frames 302 are frames captured of a software application graphic user interface, and were captured or otherwise taken In sequence over a recording period that includes frames 556-570. In this example each of the image frames 556-570 is an 8 MP frame.

Continuing with the example of FIG. 3 the count engine 204 (FIG. 2) employs a changed image counter 304 to, for each frame from the set 302, determine a count 312 of pixels that changed as between the target frame and an adjacent frame. In one example, the adjacent frame may be a frame immediately following the target frame. In another example, the adjacent frame may be a frame immediately preceding the target frame. In another example, the adjacent frame may be a frame positioned within a predetermined number of frames from the target frame. The count engine 204 records the changed-pixels counts 312 in correlation with chronological order of recording of the frames 556 through 570 (FIG. 3, 302).

Continuing with the example of FIG. 3, the identification engine 206 (FIG. 2) identifies an application-active period 314, during which consecutive frames have changed-pixels counts 312 that exceed the stored changed-pixels threshold 306. In this example, the changed-pixels threshold 306 is 3 MP and the application-active period is the period defined by consecutive frames 562 through 566.

In an example, the identification engine 206 (FIG. 2) may additionally identify application-stable periods 316A and 316B, during which consecutive frames have changed-pixels counts 312 below the stored changed-pixels threshold 306. In a particular example, the identification engine 206 may identify the application-active-period 314 after having previously identified the application-stable periods 316A and 316B that bound the application-active period 314.

Continuing with the example of FIG. 3, the recommendation engine 208 (FIG. 2) in turn generates a recommendation 310 to modify the application for which image frames were taken. In this example, the recommendation engine 208, after having determined that duration of the frames 562-566 application-active period 314 exceeds the four frame threshold period 308, generates a recommendation 310 that frames 562-566 should be modified. In an example, the modification recommendation 310 is to specific to modify the application in a manner that, after modification, reduces the duration of the same application-active period 314.

In the foregoing discussion, engines 202, 204, 206, 208 were described as combinations of hardware and programming. Engines 202, 204, 206, 208 may be implemented in a number of fashions. Looking at FIG. 4, the programming may be processor executable instructions stored on a tangible memory resource 402 and the hardware may include a processing resource 404 for executing those instructions. Thus memory resource 402 can be said to store program instructions that when executed by processing resource 404 implement system 102 of FIGS. 1 and 2.

Memory resource 402 represents generally any number of memory components capable of storing instructions that can be executed by processing resource 404. Memory resource 402 is non-transitory in the sense that it does not encompass a transitory signal but instead is made up of more or more memory components configured to store the relevant instructions. Memory resource 402 may be implemented in a single device or distributed across devices. Likewise, processing resource 404 represents any number of processors capable of executing instructions stored by memory resource 402. Processing resource 404 may be integrated in a single device or distributed across devices. Further, memory resource 402 may be fully or partially integrated in the same device as processing resource 404, or it may be separate but accessible to that device and processing resource 404.

In one example, the program instructions can be part of an installation package that when installed can be executed by processing resource 404 to implement system 102. In this case, memory resource 402 may be a portable medium such as a CD, DVD, or flash drive or a memory maintained by a server from which the installation package can be downloaded and installed. In another example, the program instructions may be part of an application or applications already installed. Here, memory resource 402 can include integrated memory such as a hard drive, solid state drive, or the like.

In FIG. 4, the executable program instructions stored in memory resource 402 are depicted as a frame set module 406, a count module 408, an identification module 410, and a recommendation module 412. Frame set module 406 represents program instructions that when executed may cause processing resource 404 to cause the implementation of frame set engine 202 of FIG. 2. Count module 408 represents program instructions that when executed cause processing resource 404 to cause the implementation of count engine 204 of FIG. 2. Identification module 410 represents program instructions that when executed cause processing resource 404 to cause the implementation of identification engine 206 of FIG. 2. Recommendation module 412 represents program instructions that when executed cause processing resource 404 to cause the implementation of recommendation engine 208 of FIG. 2.

Illustrative Example: Moving to FIG. 5 in view of FIG. 2, in an example after the frame set engine 202 obtains a set of image frames, and the count engine 204, for each frame from the set, determines a count of image areas that changed as between that frame and an adjacent frame, the count engine 204 may record the changed-image-areas count in correlation with the order of recording of target frames relative to other frames of the set by creating a graph 502. In an example of FIG. 5, the count engine 204 may successively evaluate, as a "target frame" each of a set of image frames 487-1063, and identify for each such target frame a number of changed-image areas as between the target frame and an adjacent frame. In this example, an adjacent frame is defined or predetermined to be a frame that immediately precedes the target frame under evaluation. In the example graph of FIG. 5, the target frames 487-1063 are identified in the "X" axis 504, and the number of changed pixels as between a target frame and an associated frame is identified in the "Y" axis 506.

Figure 5:
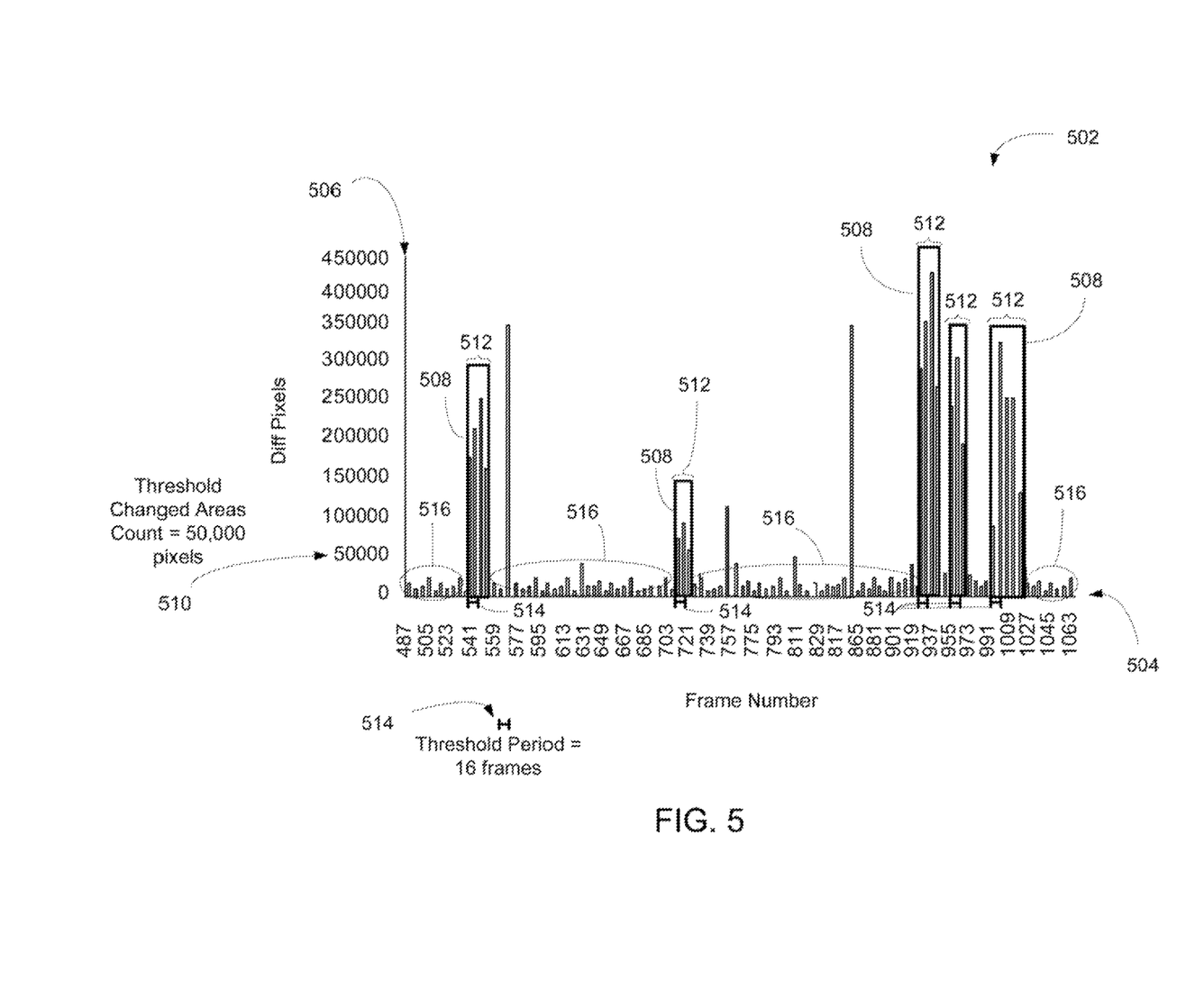
FIG. 5 is a screenshot depicting an illustrative example graph that records counts of changed-areas in image frames in correlation with order of recording of the frames.

Continuing with the example graph of FIG. 5, the identification engine 206, may identify one or more application-active periods 508 during which consecutive frames have changed-areas counts exceed a changed-areas threshold 510 (here a threshold of 50,000 changed pixels). In a particular example, the identification engine 206 may identify the application-active periods 508 by determining from the graph 502 that a first width distance 512, which first distance measures, or is measured between, a series of consecutive frames with changed pixel counts exceeding the changed-pixels threshold 510, exceeds a second width distance 514 that defines the threshold period. In the particular example of FIG. 5, the second distance 514 defines a threshold period of 16 frames, and the identification engine 206 has identified five application-active periods 508 via comparison of the first 512 and second 514 measured width distances.

In an example, the identification engine 206 may be configured to identify, in addition to the application-active periods 508, application-stable periods 516 during which consecutive frames have changed-areas counts below the changed-areas threshold. In the example of FIG. 5 the application-stable periods 516 are periods in consecutive frames have associated changed-area counts that are less than the changed-areas threshold 510 of 50,000 changed pixels. In a particular example, the identification engine 206 may be configured to, in identifying application-active periods 508, determine the application-active periods 508 as periods bounded by application-stable periods 516 (e.g., periods preceded by an application-stable period 516 and followed by an application-stable period 516).

It should be noted that while the present disclosure is discussed frequently herein in terms of measuring or determining a width of graph elements, e.g., to determine or define an application-active period or application-stable period, the teachings of the present disclosure are not so limited and such measurements, determinations and definitions can be accomplished by measuring or determining a height of graph elements, or by measuring or determining a distance between graph elements.

Figure 6:
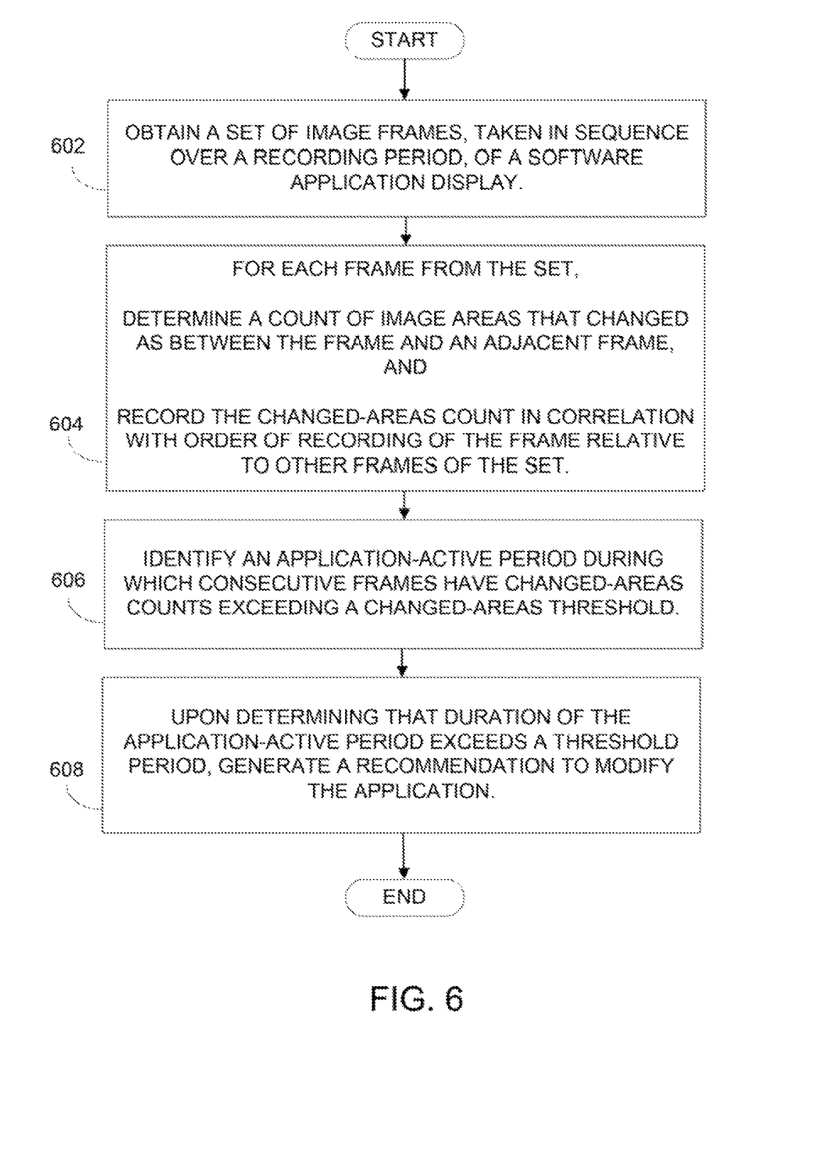
FIG. 6 is a flow diagram depicting steps taken to implement an example.

Operation: FIG. 6 is a flow diagram of steps taken to implement a method for recommending application modifications using image area counts. In discussing FIG. 6, reference may be made to the components depicted in FIGS. 2 and 4. Such reference is made to provide contextual examples and not to limit the manner in which the method depicted by FIG. 6 may be implemented. A set of image frames of a software application display, taken in sequence over a recording period, is obtained (block 602). Referring back to FIGS. 2 and 4, frame set engine 202 (FIG. 2) or frame set module 406, when executed by processing resource 404, may be responsible for implementing block 602.

For each frame from the set, a count of image areas that changed as between the frame and an adjacent frame is determined, and the changed-areas count is recorded in correlation with order of recording of the frame relative to other frames of the set (block 604). Referring back to FIGS. 2 and 4, count engine 204 (FIG. 2) or count module 408, when executed by processing resource 404, may be responsible for implementing block 604.

An application-active period, during which consecutive frames have changed-areas counts exceeding a changed-areas threshold, is identified (block 606). Referring back to FIGS. 2 and 4, identification engine 206 (FIG. 2) or identification module 410, when executed by processing resource 404, may be responsible for implementing block 606.

Upon determining that duration of the application-active period exceeds a threshold period, a recommendation to modify the application is generated (block 608). Referring back to FIGS. 2 and 4, recommendation engine 208 (FIG. 2) or recommendation module 412, when executed by processing resource 404, may be responsible for implementing block 608.

Figure 7:
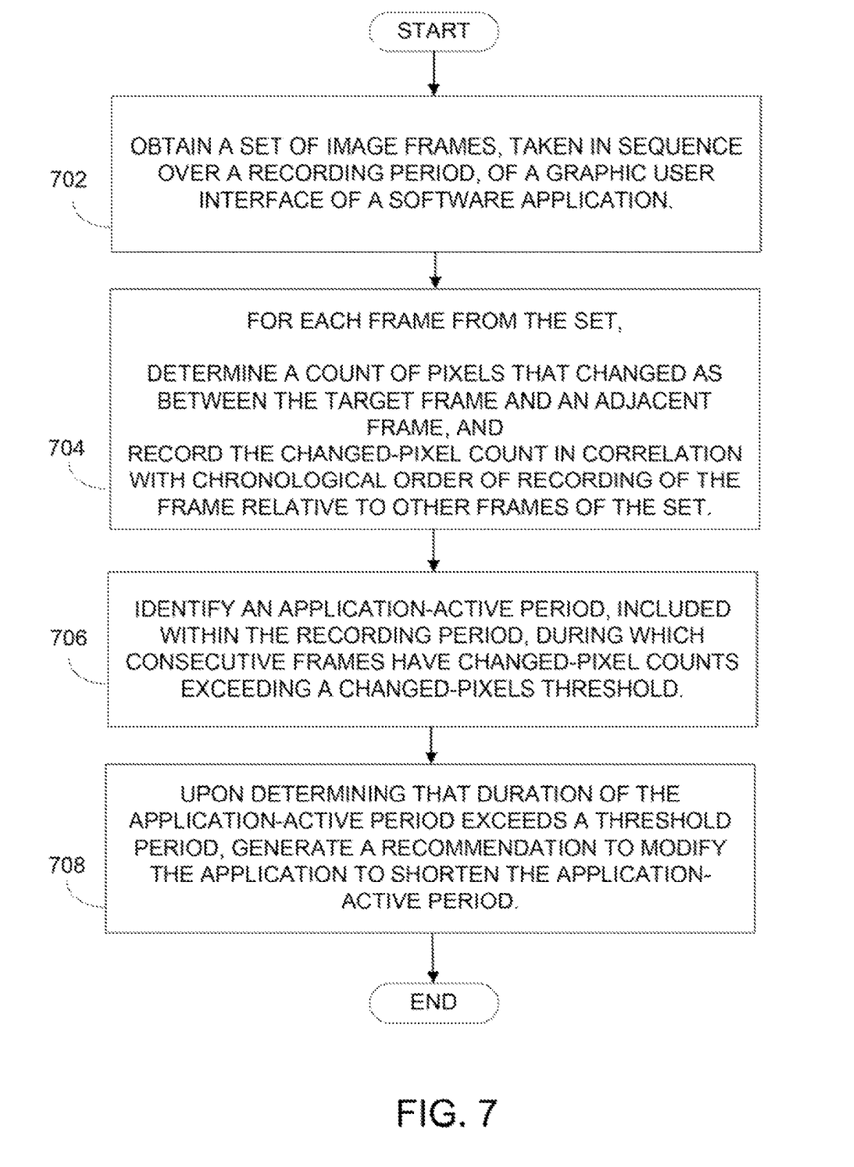
FIG. 7 is another flow diagram depicting steps taken to implement an example.

FIG. 7 is a flow diagram of steps taken to implement a method for recommending application modifications using pixel image area counts. In discussing FIG. 7, reference may be made to the components depicted in FIGS. 2 and 4. Such reference is made to provide contextual examples and not to limit the manner in which the method depicted by FIG. 7 may be implemented. A set of image frames, taken of a graphic user interface of a software application, in sequence over a recording period, is obtained (block 702). Referring back to FIGS. 2 and 4, frame set engine 202 (FIG. 2) or frame set module 406, when executed by processing resource 404, may be responsible for implementing block 702.

For each frame from the set, a count of pixels that changed as between the target frame and an adjacent frame is determined, and the changed-pixel count is recorded in correlation with chronological order of recording of the frame relative to other frames of the set (block 704). Referring back to FIGS. 2 and 4, count engine 204 (FIG. 2) or count module 408, when executed by processing resource 404, may be responsible for implementing block 704.

An application-active period, included within the recording period, and during which consecutive frames have changed-pixel counts exceeding a changed-pixels threshold, is identified (block 706). Referring back to FIGS. 2 and 4, identification engine 206 (FIG. 2) or identification module 410, when executed by processing resource 404, may be responsible for implementing block 706.

Upon determining that the duration of the application-active period exceeds a threshold period, a recommendation to modify the application to shorten the application-active period is recommended (block 708). Referring back to FIGS. 2 and 4, recommendation engine 208 (FIG. 2) or recommendation module 412, when executed by processing resource 404, may be responsible for implementing block 708.

Conclusion: FIGS. 1-7 aid in depicting the architecture, functionality, and operation of various embodiments. In particular, FIGS. 1-4 depict various physical and logical components. Various components are defined at least in part as programs or programming. Each such component, portion thereof, or various combinations thereof may represent in whole or in part a module, segment, or portion of code that comprises one or more executable instructions to implement any specified logical function(s). Each component or various combinations thereof may represent a circuit or a number of interconnected circuits to implement the specified logical function(s). Embodiments can be realized in any memory resource for use by or in connection with processing resource. A "processing resource" is an instruction execution system such as a computer/processor based system or an ASIC (Application Specific Integrated Circuit) or other system that can fetch or obtain instructions and data from computer-readable media and execute the instructions contained therein. A "memory resource" is any non-transitory storage media that can contain, store, or maintain programs and data for use by or in connection with the instruction execution system. The term "non-transitory" is used only to clarify that the term media, as used herein, does not encompass a signal. Thus, the memory resource can comprise any one of many physical media such as, for example, electronic, magnetic, optical, electromagnetic, or semiconductor media. More specific examples of suitable computer-readable media include, but are not limited to, hard drives, solid state drives, random access memory (RAM), read-only memory (ROM), erasable programmable read-only memory, flash drives, and portable compact discs.

Although the flow diagrams of FIGS. 6 and 7 show specific orders of execution, the orders of execution may differ from that which is depicted. For example, the order of execution of two or more blocks or arrows may be scrambled relative to the order shown. Also, two or more blocks shown in succession may be executed concurrently or with partial concurrence. All such variations are within the scope of the present invention.

The present invention has been shown and described with reference to the foregoing exemplary embodiments. It is to be understood, however, that other forms, details and embodiments may be made without departing from the spirit and scope of the invention that is defined in the following claims.

What is claimed is:

1. A memory resource storing instructions that when executed cause a processing resource to:
obtain a set of image frames, taken in sequence over a recording period, of a software application display;
for each frame from the set,
determine a count of image areas that changed as between the frame and an adjacent frame;
record the changed-areas count in correlation with order of recording of the frame relative to other frames of the set;
identify an application-active period during which consecutive frames have changed-areas counts exceeding a changed-areas threshold; and
upon determining that duration of the application-active period exceeds a threshold period, generate a recommendation to modify the application.

2. The memory resource of claim 1, wherein the count of image areas is a count of pixels.

3. The memory resource of claim 1, wherein to determine that the duration of the application-active period exceeds the threshold period, the instructions are to cause the processing resource to determine a width or height of graph elements that measures the application-active period.

4. The memory resource of claim 1, wherein the recommendation is to modify the application to in a manner designed to shorten the application-active period.

5. The memory resource of claim 1, wherein the application-active period is a period within the recording period.

6. The memory resource of claim 1, wherein the adjacent frame is an immediately-following frame.

7. The memory resource of claim 1, wherein the adjacent frame is an immediately-preceding frame.

8. The memory resource of claim 1, wherein the instructions are to cause the processing resource to identify application-stable periods during which no consecutive frames have changed-areas counts greater than the changed-areas threshold.

9. A system to generate application modification recommendations, comprising:
a processor; and
a memory storing instructions that when executed cause the processor to:
obtain a set of image frames, taken in sequence over a first period, of a software application graphic user interface;
for each frame from the set,
determine a count of pixels that changed as between the frame and an adjacent frame;
record the changed-pixels count in correlation with chronological order of recording of the frame;
identify a second period, during which consecutive frames have changed-pixels counts exceeding a changed-pixels threshold; and
generate a recommendation to modify the application based at least in part upon a determination that duration of the second period exceeds a threshold period.

10. The system of claim 9, wherein the instructions are to cause the processor to record the changed-pixels count in correlation with chronological order of recording of the frame includes instructions to cause the processor to create a graph.

11. The system of claim 10, wherein to determine that the duration of the second period exceeds the threshold period, the instructions are to cause the processor to determine from the graph that a first distance, measuring a series of consecutive frames with changed pixel counts exceeding the changed-pixels threshold, exceeds a second distance defining the threshold period.

12. The system of claim 9, wherein the to identify third and fourth periods during which consecutive frames have changed-pixels counts below the changed-pixels threshold, and wherein the second period is bounded by the third and fourth periods.

13. The system of claim 9, wherein the recommendation is to modify the application to in a manner designed to reduce the second period.

14. The system of claim 9, wherein the second period is a period within the first period.

15. A method, comprising:
obtaining a set of image frames, taken in sequence over a recording period, of a graphic user interface of a software application;
for each frame from the set,
determining, by a processor of a computing device, a count of pixels that changed as between the frame and an adjacent frame;
recording, by the processor, the changed-pixels count in correlation with chronological order of recording of the frame relative to other frames of the set;
identifying, by the processor, an application-active period, included within the recording period, during which consecutive frames have changed-pixels counts exceeding a changed-pixels threshold; and
upon determining that duration of the application-active period exceeds a threshold period, generating, by the processor, a recommendation to modify the application to shorten the application-active period.

16. The method of claim 1, wherein determining that the duration of the application-active period exceeds the threshold period includes determining a width or height of graph elements that measures the application-active period.

17. The method of claim 1, wherein the recommendation is to modify the application to in a manner designed to shorten the application-active period.

18. The method of claim 1, further comprising:
identifying additional periods during which consecutive frames have changed-pixels counts below the changed-pixels threshold, wherein the application-active period is bounded by the additional periods.

* * * * *